United States Patent
Gusat et al.

(10) Patent No.: US 8,879,390 B2
(45) Date of Patent: Nov. 4, 2014

(54) METHOD, COMMUNICATION NETWORK AND DATACENTER FOR TRAFFIC MANAGEMENT IN A COMMUNICATION NETWORK

(75) Inventors: Mircea Gusat, Zurich (CH); Cyriel Johan Minkenberg, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 515 days.

(21) Appl. No.: 13/074,063

(22) Filed: Mar. 29, 2011

(65) Prior Publication Data
US 2011/0242976 A1    Oct. 6, 2011

(30) Foreign Application Priority Data
Mar. 30, 2010  (EP) .................................... 10158472

(51) Int. Cl.
*H04L 12/28*  (2006.01)
*H04L 12/801*  (2013.01)
*H04L 12/803*  (2013.01)

(52) U.S. Cl.
CPC .............. *H04L 47/10* (2013.01); *H04L 47/122* (2013.01)
USPC ........................................................ 370/235

(58) Field of Classification Search
None
See application file for complete search history.

(56) References Cited

U.S. PATENT DOCUMENTS

| | | | |
|---|---|---|---|
| 6,526,022 B1 * | 2/2003 | Chiu et al. | 370/229 |
| 7,016,971 B1 * | 3/2006 | Recio et al. | 709/233 |
| 2006/0056308 A1 * | 3/2006 | Gusat et al. | 370/252 |
| 2007/0081454 A1 | 4/2007 | Bergamasco et al. | |
| 2008/0273465 A1 * | 11/2008 | Gusat et al. | 370/236 |

OTHER PUBLICATIONS

Pat Thaler, et al., IEEE 802 Tutorial: Congestion Notification, Jul. 17, 2006, pp. 1-45, San Diego, CA.
David V. James, P1796 Resilient Backplane Ring (RBR) "Congestion Management," Nov. 15, 2004, pp. 1-30.
G. F. Pfister & V. A. Norton "Hot Spot Contention and Combining Multistage Interconnection Networks", IEEE Transaction on Comps, Oct. 1985, pp. 943-948 vol. C-34, No. 10.

* cited by examiner

*Primary Examiner* — Anh-Vu Ly
(74) *Attorney, Agent, or Firm* — Tutunjian & Bitetto, P.C.; Jeff Tang

(57) ABSTRACT

Method, communication network and datacenter for data traffic management in a communication network. The invention provides a method for data traffic management in a communication network. The method includes setting up a first communication path for a first data communication and transmitting data from a source of the first data communication to a destination of the first data communication. Then, features of a saturation tree representing a congestion of data transmission in the first data communication are monitored and a data rate of the first data communication along the first communication path is adapted based on the monitored features. The present invention further provides a datacenter and a communication network.

17 Claims, 6 Drawing Sheets

METHOD, COMMUNICATION NETWORK AND DATACENTER FOR TRAFFIC MANAGEMENT IN A COMMUNICATION NETWORK

CROSS REFERENCE TO RELATED APPLICATION

This invention claims priority under 35 U.S.C. 119 from Swiss Application 10158472.0, filed Mar. 30, 2010, the entire contents of which are herein incorporated by reference.

BACKGROUND OF THE INVENTION

1. Field of the Invention

The present invention relates to a method for data traffic management in a communication network. The present invention further relates to a datacenter and a communication network.

2. Description of Related Art

A communication network includes a plurality of network nodes which are suitably connected with each other via wired or wireless links. Messages from a source node to a destination node are routed through switching nodes (or routers or switches) of the communication network using a routing protocol such as TCP/IP. This TCP/IP protocol where TCP and IP stand for Transmission Control Protocol and Internet Protocol, respectively, is widely used for data communication via the internet. The present invention relates in general to communication networks and in particular to so called Ethernet communication systems according to the IEEE 802 DCB standard, aka CEE. Hereinafter, the present invention and its underlying problem are, therefore, described with regard to such Ethernet networks using TCP/IP; it being noted that it can nonetheless be applied to other communication networks as well.

In a communication network, a many-to-one data communication is a basic requirement. A source node transmits data in the form of a plurality of data packets or short packets to a switching node. The switching node receives and transmits each packet to a specific destination node based on the address in the header of the specific data packet. However, if one or more destination nodes stop responding and/or slow down, then the switching node suffers from hogging and blocking. This leads to the creation of a phenomenon (i.e. data transmission capability is going down) which can be represented by a so-called saturation tree. The present application addresses the efficient use of existing resources of such a communication network.

Hereinafter a hotspot of a data communication (also known as bottleneck or points of congestion) describes an abstract entity such as an event or a location describing the effect of the communication demands data rate or data stream which exceed a current communication supply. A hotspot is a communication phenomenon where the performance or capacity of the entire communication network is limited by a single or limited number of components or resources. If one or more hotspots are present a backlog in the data communication is generated. If within a communication network multiple inter-correlated hotspots are present, a saturation tree is generated which somehow combines the backlog effect of the set of inter-correlated multiple hotspots.

One reason for the slowing down of the data transmission, the creation of hotspots and saturation trees is the so-called data congestion. In today's communication networks, data congestion may occur when a switching node or destination node receives more data packets than it is able to process. Data congestion may also occur when data packets should be transferred from a faster to a slower transport element or portion of the communication network. In this regard, the corresponding network nodes and the slower transport elements or portions are forming a kind of a bottleneck of this data communication. In order to avoid these data congestions or bottlenecks, modern communication networks include congestion control approaches to achieve high performance of the data traffic through the different nodes of the communication network. These congestion control mechanisms are used to control the rate of data entering the network, keeping the data stream below a certain data rate that would trigger a collapse.

For example, US 2007/0070901 A1 discloses a method and a system for congestion management for converged network interface devices.

Recent trends illustrate a shift from large main frame computing to commodity classes of service in datacenters. Datacenters (also known as center networks) are facilities for housing several computer systems and various components associated with the computer system. Datacenters are especially a collection of computing, storage and/or memory nodes which are interconnected via a (communication) network, such as a network in a fat tree topology. For example, a typical datacenter may include in addition to a computer or a server system, other devices and facilities such as backup power supplies, backup data communication connections, environmental controls, security components and the like. Those datacenters can be connected with the Ethernet or internet using TCP/IP protocols. Future datacenters will therefore focus on internet and Ethernet compliance for example for blade clustering, storage, LAN-application, etc. Data congestion, however, still remains a basic problem with datacenters.

Hence, it is a challenge to improve the traffic and data management with regard to data congestion in modern communication networks.

BRIEF SUMMARY OF THE INVENTION

To overcome these deficiencies, the present invention provides a method for data traffic management in a communication network, including: setting up a first communication path for a first data communication and transmitting data from a source of the first data communication to a destination of the first data communication; monitoring features of a saturation tree representing a congestion of data transmission in the first data communication; and adapting a data rate of the first data communication along the first communication path based on the monitored features.

According to another aspect of the present invention, the present invention provides a datacenter for data traffic management in a communication network, including: a saturation tree sensor designed to monitor features of a saturation tree representing a congestion of data transmission in the communication network; and a control device operatively coupled to the saturation tree sensor designed to adapt the data rate of a first data communication along a first communication path based on the monitored features.

According to yet another aspect of the present invention, the present invention provides a communication network, including: a plurality of source nodes; a plurality of destination nodes; and a plurality of switching nodes arranged between the source nodes and the destination nodes to provide a plurality of data communication links between the source nodes and the destination nodes, wherein at least one of the source nodes is a datacenter, wherein the datacenter further includes a saturation tree sensor designed to monitor features of a saturation tree representing a congestion of data transmission in the communication network; and a control device operatively coupled to the saturation tree sensor designed to adapt the data rate of a first data communication along a first communication path based on the monitored features.

BRIEF DESCRIPTION OF THE SEVERAL VIEWS OF THE DRAWINGS

For a more complete understanding of the present invention and advantages thereof, reference is now made to the following description taken in conjunction with the accompanying drawings. The invention is explained in more detail below using exemplary embodiments which are specified in the schematic figures of the drawings, in which.

Skilled artisans will appreciate that elements in the figures are illustrated for simplicity and clarity and are not necessarily drawn to scale. For example, the chosen elements are only used to help to improve the understanding of the functionality and the arrangements of these elements in various embodiments of the present invention. Also, common but well understood elements that are useful or necessary in a commercially feasible embodiment are mostly not depicted in order to facilitate a less abstracted view of these various embodiments of the present invention. It will further be appreciated that certain actions and/or steps in the described methods may be described or depicted in a particular order of occurrences while those skilled in the art will understand that such specificity with respect to sequence is not actually required. It will also be understood that the terms and expressions used in the present specification have their ordinary meaning as is accorded to such terms and expressions with respect to their corresponding respective areas of inquiry and study, except where specific meanings are otherwise set forth herein.

DETAILED DESCRIPTION OF THE PREFERRED EMBODIMENTS

The present invention is hereinafter described in more detail with regard to the block diagrams shown in FIGS. 1A-1C.

Figure 1A:
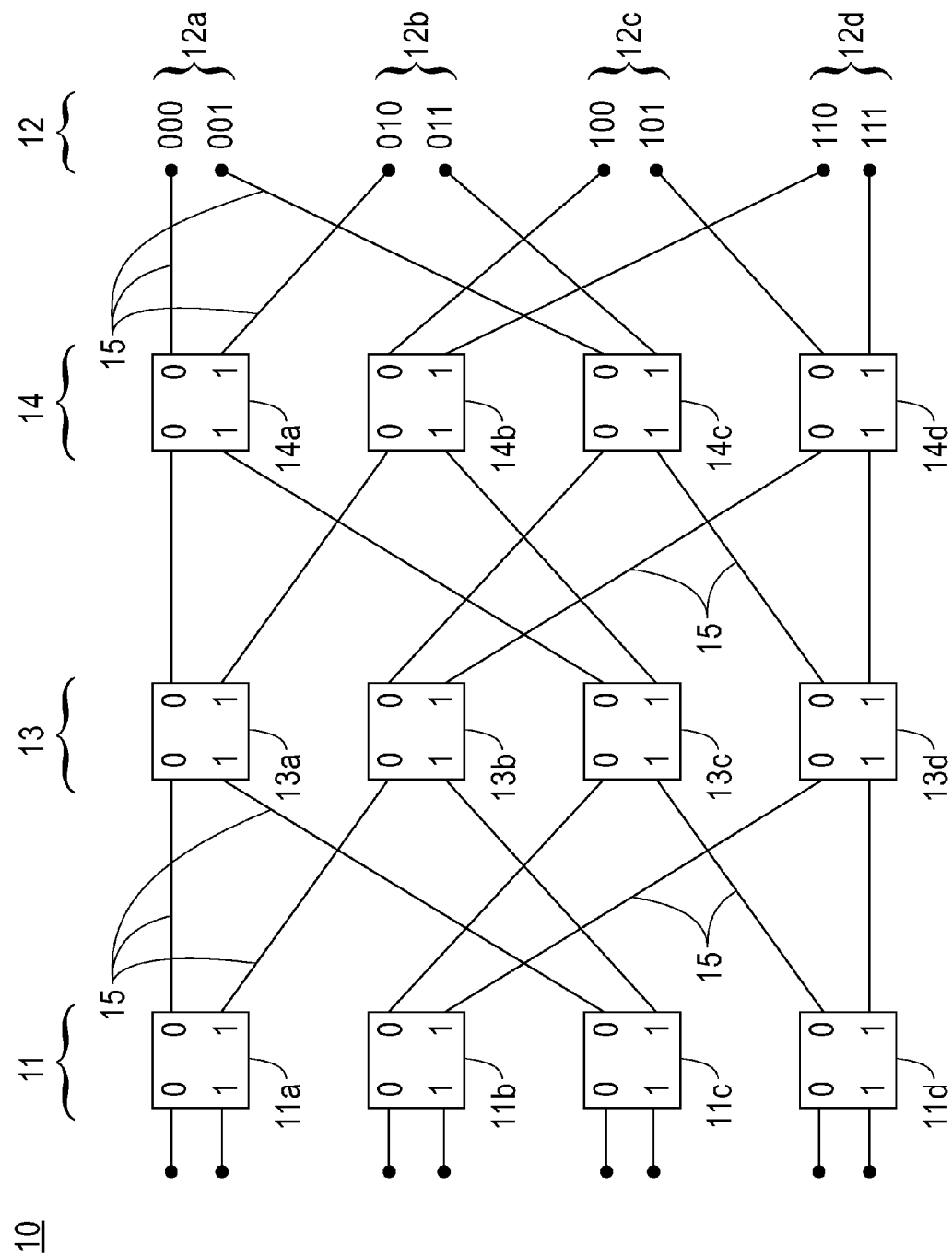
FIG. 1A shows a block diagram of a multistage communication network.

FIG. 1A shows a block diagram of a multistage communication network. In this embodiment the communication network 10 which is denoted by reference number 10 is significantly simplified. The communication network 10 includes a source stage 11, a destination stage 12 and two switching stages 13, 14 arranged between the source stage 11 and destination stage 12. In the present example, each stage 11-14 includes altogether four switches (or routers, network nodes, or buffers). Each of the switches includes two input terminals inverse to each other and two output terminals which are also inverse to each other. In the present case, each output terminal of the source nodes 11a-11d of the source stage 11 is connected to one respective input terminal of a switch 13a-13d of the first stage 13. Furthermore, the output terminals of the switches 13a-13d of the first stage 13 are connected to one input terminal of the switches 14a-14d of the second stage 14 and the output terminals of these switches 14a-14d are each connected to one input terminal of a destination node 12a-12d in the destination stage 12. This results in a rather simplified communication network 10, since always only one communication line 15 is present between an output terminal of an element in one stage and the input terminal of an element of an adjacent stage.

Figure 1B:
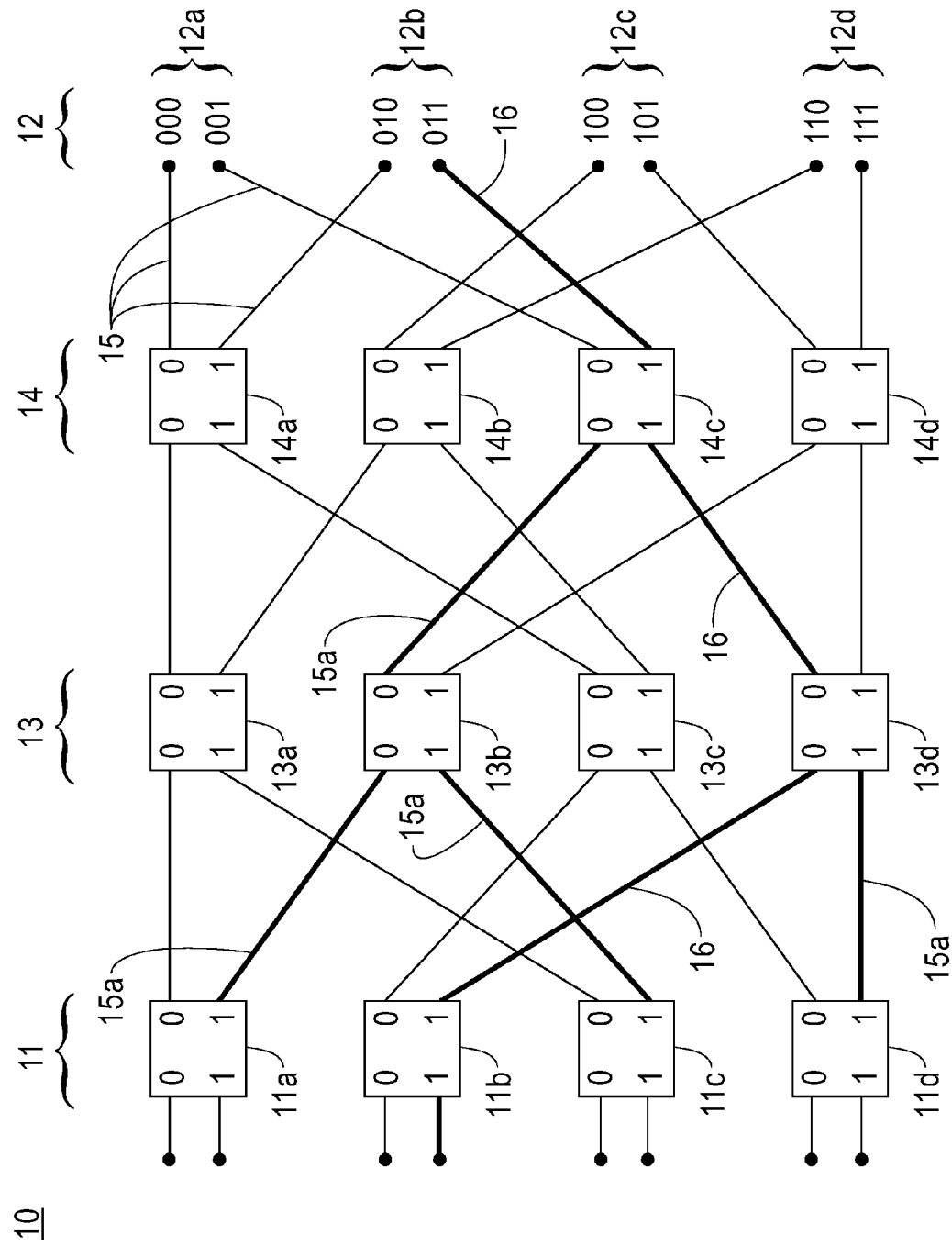
FIG. 1B shows a block diagram of the multistage communication network of FIG. 1A having a communication path.

FIG. 1B shows a block diagram of the multistage communication network of FIG. 1A having a communication path. FIG. 1B shows a scenario where data from the source node 11b of the source stage 11 should be transmitted to an address "011" which is dedicated to a destination node 12b in the destination stage 12. For the data transmission between the source node 11b and the destination node 12b a communication path 16 is established.

Figure 1C:
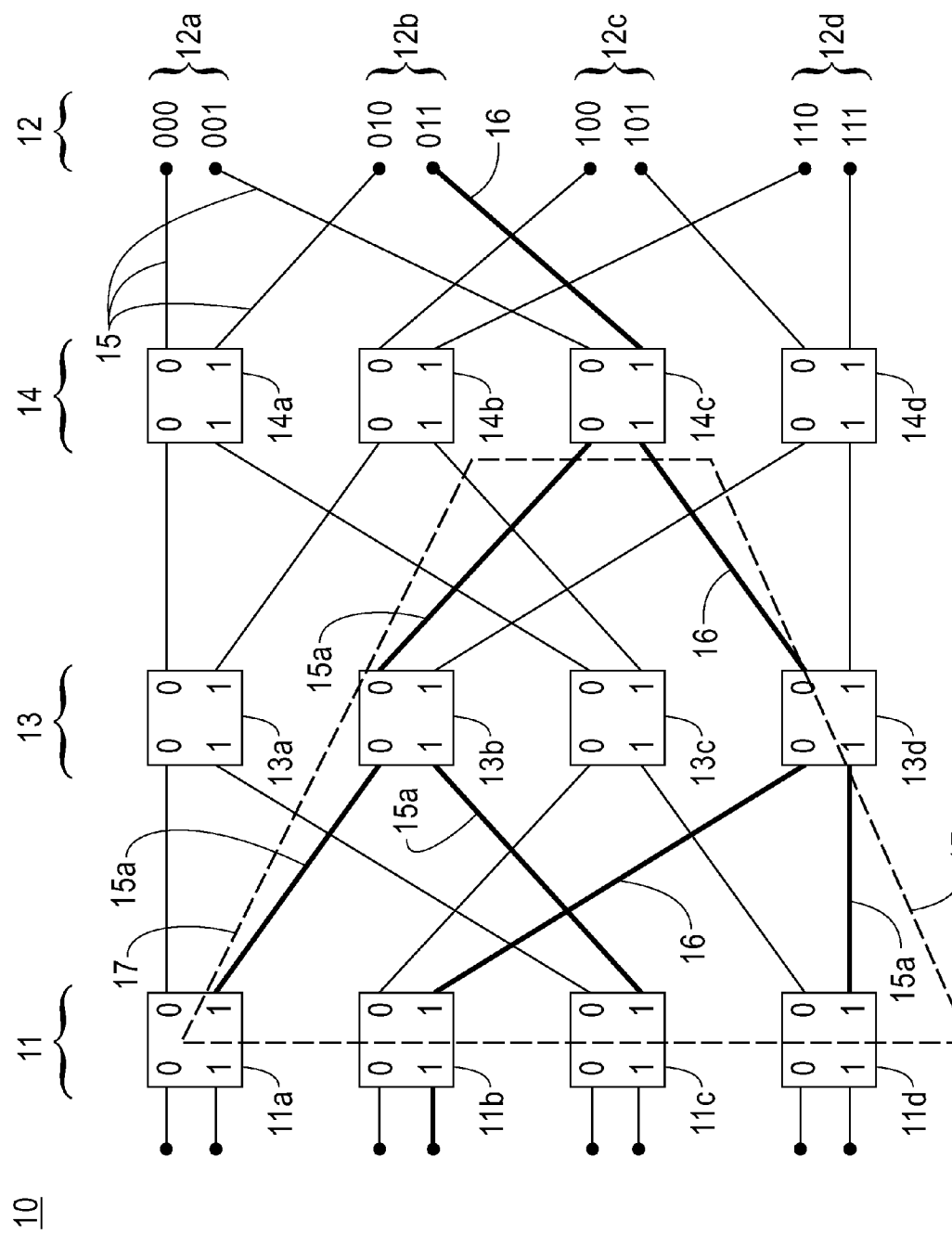
FIG. 1C shows a block diagram of the multistage communication network of FIG. 1B having blocked links resulting in a saturation tree.

This is shown in FIG. 1C which shows a block diagram of the multistage communication network of FIG. 1B having blocked links resulting in a saturation tree 17. Here, a communication path 16 is established between the source node 11b and the destination node 12b. In the example in FIG. 1C the destination node 12b is connected through input terminal of the switch 14c of the second stage 14 to the inverse output terminal of the switch 13d of the first stage 13. As a consequence of this, the link 15a between the switch 14c and the switch 13b is blocked. As a consequence of this also the links 15a between the switch 13b and the corresponding switches 11a, 11c of the first stage 11 are blocked. Furthermore, the communication path 16 is formed between the inverse input terminal of the switch 13d of the first stage 13 and an output terminal of the switch 11b resulting in a blocking of the link 15a between the switch 13d and the switch 11d. Summarizing this, if a communication path 16 between the source node 11b and the destination node 12b is established, several other nodes and links 15a between employed switches 11b, 13d, 14c, 12b can be blocked depending on the data volume to be transmitted through the network.

A hotspot 14c generally refers to a particular (memory) location in a large scale multiprocessing system such as a data communication network 10. The congestion of a particular hotspot 14c may create congestion in the communication network 10. Usually, a so-called saturation tree 17 of saturated switches routed at the hotspot 14c and extending backwards to the data source processor is formed which causes excessive delay for both the hotspot 14c and regular non-hotspot requests.

One basic issue when establishing such a communication path 16 between a distinct source node and a hotspot destination is that the other nodes of the communication network 10 should not or even must not establish other communication paths within the same communication network 10. This is not a controversial issue as long as the communication rate for transmitting data and thus the data transmission capability is low and if only one or at least very few requests for executing data communication through the communication network are present. In those cases, it is typically possible to establish one communication path after the other without reducing the data rate and the data traffic capability. However, in modern communication networks the trend goes towards high speed communication networks which are able to transfer high data rates through the communication network. In those cases it is very likely that at least two source nodes will simultaneously want to set-up a data transmission. However, the communication network may not be capable of dealing with all this data at the same time. Therefore, in order to avoid data corruption or data loss typically data tuning and management mechanisms are provided in modern high speed and high data rate communication networks. As a consequence of this, in the different interface protocols, such as TCP/IP, the input and output terminals of a switch have to be blocked when data communication is conducted through the other input and output terminals, respectively, of the same switch. However, due to this convention several switches and links 15 of the communication network 10 are blocked for data communication if a desired communication path 16 between a source node 11*b* and a destination node 12*b* is established. The node 14*c* in FIG. 1B forms a so-called hotspot, or a bottleneck of a data communication. If one or more of such hotspots 14*c* are present, a so-called saturation tree (also tree of saturation or tree of congested communication) arises. This saturation tree 17 will reduce the data traffic capability of the communication network 10 and increase the danger of congestion significantly.

The blocked links between adjacent switches are denoted by reference number 15*a* in FIG. 1B. Furthermore, the saturation tree resulting from these blocked links 15 is symbolically depicted by the area 17 in FIG. 1C. It should however be kept in mind that a saturation tree is first and foremost a mathematical representation which reflects the congestion mechanism. In the case of a complex communication network 10, it can be easily understood that a huge number of switches can be blocked even if they are far away from the communication path 16. This applies especially for those cases where multiple hotspots are present within the same communication network. If these hotspots correlate with each other, e.g. if they show a spatial and/or temporal relationship to each other, the corresponding saturation tree will then be much more complex and cover much more links within the data communication network.

Figure 2:
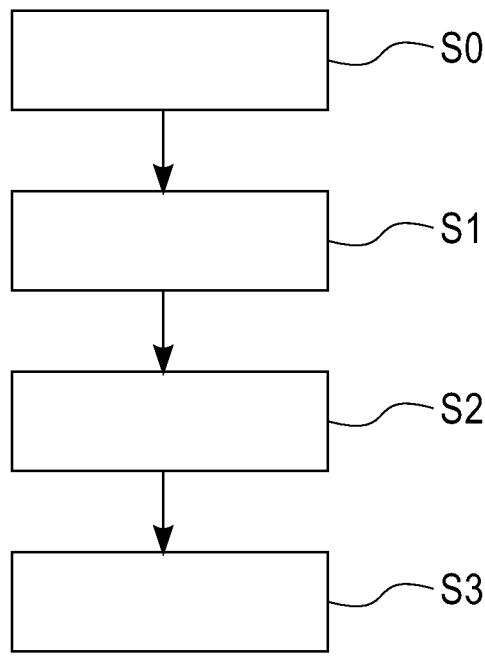
FIG. 2 shows an embodiment of the method according to the present invention.

With regards to FIG. 2, a method for data traffic management in a communication network according to the present invention is described. According to this method, a communication network including at least one source node and one destination node is provided (S0), the latter being the destination of the data communication. For example, a datacenter may actually be the source (yet, conversely, the datacenter could include both the source and the destination node, as emphasized earlier). For data communication, and therefore for transmitting data from the datacenter to a specific destination, in step S1 a communication path is set up. For this data communication the data to be transmitted is read out from a memory module in the datacenter. This data is then transmitted to the corresponding memory module in the specific destination. During this data communication the datacenter is sensing the generation of any saturation tree in the communication network. As explained, saturation trees may occur when setting up the communication path. Should a saturation tree be detected, features thereof are monitored in step S2. The datacenter will in the next step S3 adapt the data rate of a data stream through the communication path depending on features (e.g. information, data) of this saturation tree. The data rate can be adapted by, but is not limited to, a Ziegler-Nichols method, a Smith Predictor method, or a direct numerical calculation method. Since a saturation tree is able to capture the congestion mechanism, it is appropriate to base a correction mechanism on features thereof. Typically, but not necessarily, the datacenter will then reduce the data rate through the communication path. By adapting and especially by reducing this data rate, the data traffic (i.e. the data stream through an interface of the datacenter and thus through the established communication path) is controlled such as to reduce and possibly eliminate the congestion (and thus the saturation tree).

Hereinafter, with regard to FIG. 3, a datacenter for use in a communication network according to an embodiment of the present invention is described in more detail. Especially, this datacenter can be used for executing a method as being described with regard to FIG. 2.

Figure 3:
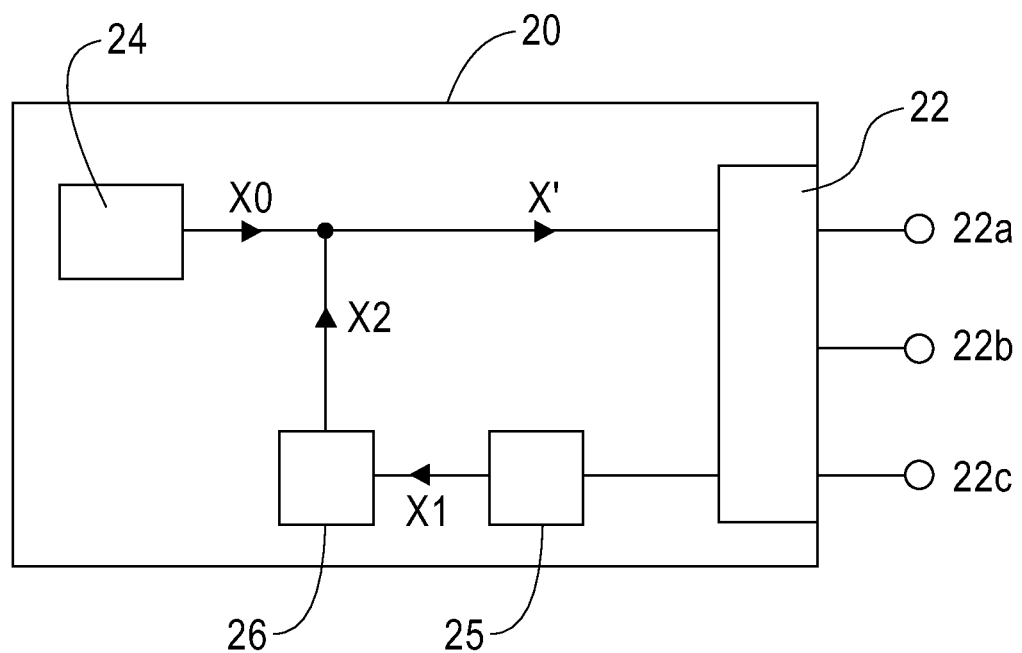
FIG. 3 shows an embodiment of the datacenter according to the present invention.

In FIG. 3 the datacenter is denoted by reference number 20. The datacenter includes an interface 22. In the present example the interface 22 includes three output terminals 22*a*-22*c*. The interface 22 is designed to be connected to a communication network to set up a data communication with a destination node in the communication network. The datacenter 20 further includes a memory module 24, such as a DRAM, CD-ROM or the like, for storing data therein. In case of a data communication, the data stored in the memory module 24 is read out. The memory module 24 provides a data signal X0, X' which is forwarded to the interface 22. Via one or more of the terminals 22*a*-22*c* of the interface 22, this data X0 can be transmitted to another node of the communication network.

According to an embodiment, the datacenter 20 further includes a saturation tree sensor 25 and a control device 26. The saturation tree sensor 25 is connected to the interface 22 of the datacenter 20 and is designed to sense the generation of any saturation tree in the communication network which can be caused by a data communication between the datacenter 20 and a destination node. The saturation tree sensor 25 is further designed to detect other saturation trees and thus the corresponding hotspots which are generated by other communication paths of the communication network and which e.g. correlate with the communication path between the datacenter 20 and the corresponding destination node. The saturation tree sensor 25 may for instance provide sensor information X1 to the control device 26, whereas the sensor signal X1 includes information of a sensed saturation tree in the communication network. The control device 26 analyzes this information in the sensor signal X1 and provides a control signal X2 at its output. Depending on the existence of the sensed saturation tree, the control device 26 generates the control signal X2 such to adapt the data signal X0 provided by the memory module 24. Therefore, depending on this control signal X2 and thus on the sensed saturation tree, the data stream X', which includes data read out by the memory module 24 is adapted and especially reduced.

Figure 4:
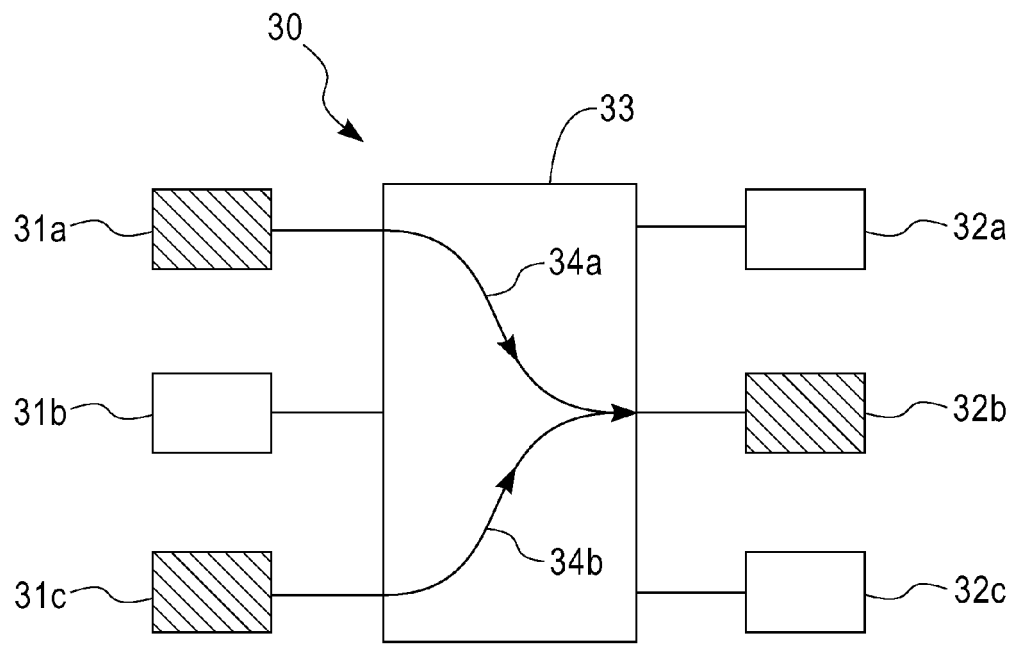
FIG. 4 shows an embodiment of a communication network according to the present invention.

FIG. 4 shows a very simplified block diagram of a communication network according to an embodiment of the present invention.

In FIG. 4, the communication network is denoted by reference number 30. The communication network 30 includes altogether three source nodes 31*a*-31*c*, three destination nodes 32*a*-32*c* and several interconnection nodes which are only schematically sketched by the block 33 in FIG. 4. This block 33 not only includes several switching nodes, but also the corresponding interconnections and links between the source nodes 31*a*-31*c*, destination nodes 32*a*-32*c* and switching nodes 33.

In the present example, it is assumed that, for example two of the source nodes 31*a* and 31*c* are datacenters. Conversely, the depicted nodes can be nodes in a datacenter, as explained above. Furthermore, it is assumed that both source and nodes

31a, 31c are concurrently requesting an access to the same destination node 32b. Furthermore, and for the sake of exemplification only, it is assumed that the destination node 32b is a database application capable of operating with a data rate of 100 GBit/sec. It is further assumed that both datacenters 31a and 31c are also database applications which provide data with a data rate higher than 50 GBit/sec, e.g. 60 GBit/sec. If, for example, both datacenters 31a and 31c intend to set up a communication path 34a and 34b to the destination node 32b at the same time, a mismatch problem of the data rate occurs, since both datacenters 31a and 31c provide a data rate of altogether 120 GB/s whereas the destination node 32b is only capable of reading a data stream of 100 GB/s maximum. Without any further technology, congestion will occur in the block 33, giving rise to a saturation tree.

According to an embodiment of the present invention, however, at least one of the datacenters 31a and 31c and especially both datacenters 31a and 31c are provided with the same functionalities as the datacenter 20 shown in FIG. 3. Thus, these datacenters 31a and 31c include a saturation tree sensor 25 in order to sense the generation of a saturation tree and adapt the data stream in the corresponding communication paths 34a and 34b accordingly. Especially, at least one of these datacenters 31a and 31c and especially both of them are designed to reduce the data rates of the data streams X' such that the overall data rate through the communication paths 34a and 34b is reduced below the maximum capability of 100 GB/s. Therefore, the generation of saturation trees in this block 33 caused by too much data is reduced and possibly eliminated.

More generally, a method is implemented, whereby features of a detected saturation tree 17 (i.e. reflecting congestion in the first data communication) are monitored and the data rate of the first data communication along the first communication path 34a and 34b is suitably adapted based on the monitored features. Thus, the nodes 31a and 31c are not necessarily datacenters but can instead be conventional nodes.

Figure 5:
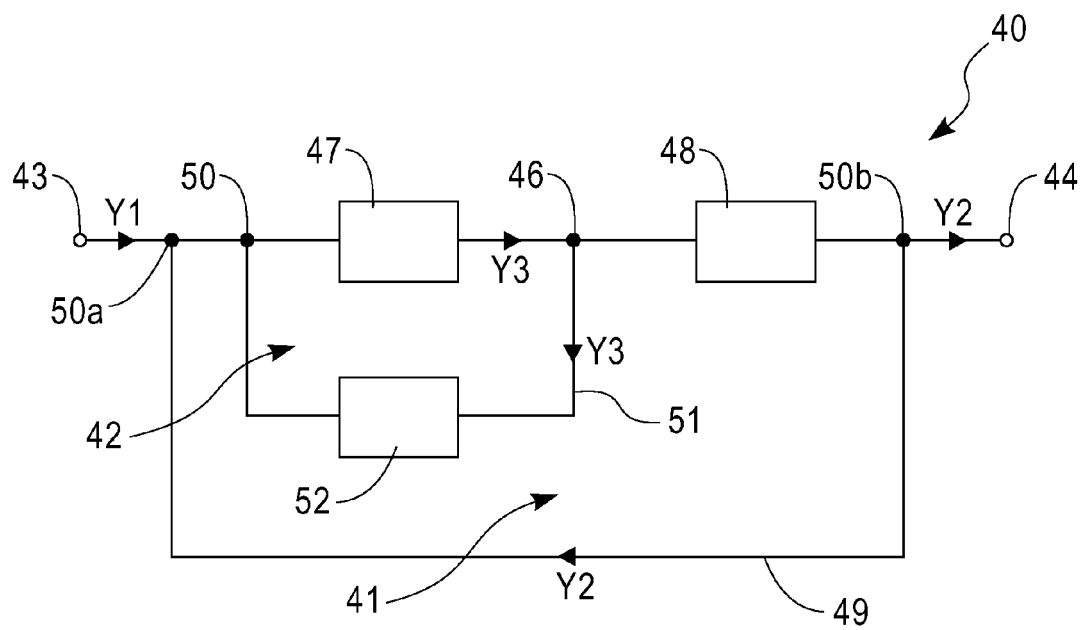
FIG. 5 shows a block diagram for illustrating a dual loop control mechanism for data traffic management in a communication network, according to an embodiment.

FIG. 5 shows a block diagram for illustrating the dual-loop control mechanism for data traffic management in a communication network.

According to an embodiment of the present invention a so-called dual-loop control mechanism 40 is employed which includes an outer loop 41 and an inner loop 42. The outer loop 41 is arranged between a source 43 and a destination (route) 44. In the feed forward path 46 a data signal Y1 from the source 43 is provided through a proportional integral derivative (PID) controller 47 and a root plant block 48 to the destination 44. The output signal Y2 at the output 50b via a feedback line 49 is further provided to the input terminal 50a. The block 47 denotes the PID controller 47 which is used to calculate an error value as the difference between a measured process variable and a desired set point. This PID controller 47 generally attempts to minimize the error by adjusting the process control input. The root plant block 48 illustrates the feed forward delay and the root plant which is typically given when a data signal is transmitted through a given communication path in the communication network.

According to an embodiment of the present invention an additional second, inner loop 42 is provided. The inner loop 42 includes a feedback line 51 which includes a second root plant block 52. An output signal Y3 of the compensated PID controller 47 is provided through the feedback line 51 via the second root plant block 52 to the input terminal 50.

Hereinafter, an example of functionality of this additional root plant block 52—which forms the saturation tree sensor—is described briefly:

The saturation tree sensor 52 lumps all forward and backward delays of the saturation tree which is formed by the single communication path. Furthermore, the root plant of the data communication network is measured and linearized. For this, an approximation algorithm such as the so-called Padé approximation algorithm is applied. Having gained this information, a model of the root plant and thus a simulated root plant is provided. This simulated root plant should simulate the root plant of the block 48 as well as possible. This information of the root plant is provided to the PID controller 47 which adjusts the gain of the data stream transmitted from the source 43 to the destination 44. Especially, the data rate of the data stream between those nodes 43 and 44 is adjusted and typically reduced.

More generally, the monitored features of the saturation tree include any suitable model of the saturation tree. The estimated model is then used as a control parameter of the feedback loop in the inner loop 42.

It is noted that the inner loop 42 and especially the saturation tree sensor 52 is e.g. implemented within the datacenter itself. The PID controller 47 may also be implemented in the datacenter or outside the datacenter, yet within the data communication network. It can also be possible that the PID controller is partially implemented as well in the datacenter and outside the datacenter in the data communication network. Preferably, the PID controller 47 is being provided by the control device 26 in the datacenter 20 of FIG. 3. It should be noted, however, that various modifications to implement this dual-loop mechanism are possible.

Hereinafter some general aspects of the generation of a saturation tree, the saturation tree phenomenon, the saturation tree detection and the saturation tree control and compensation mechanism are described.

Conventional congestion management mechanisms are widely known in conventional communication networks in order to stabilize the data communication between correlated and/or linked network nodes. However, these conventional congestion management methods do not address one basic problem of growing relevance which is directed to so-called multiple hotspots. These multiple hotspots—if correlated with each other—may generate a saturation tree within the communication network. Basically, two types of saturation trees are possible depending on the correlation of the corresponding hotspots:

a) Spatial saturation trees, also known as strict, proper or simple saturation trees;
b) Generalized or quasi saturation trees.

Datacenter networks which are typically (but not necessarily) lossless are directly exposed to strict saturation trees. However, irrespective of lossy or lossless networks even in the absence of link level flow control (LL-FC) certain network topologies and traffic loads can lead to correlated hotspots. Those multiple correlated hotspots typically, but not necessarily contiguous, may aggregate in time (e.g. repeat in a sequence) and space (possibly a sparse cluster) to establish a deterministic pattern and hence a generalized saturation tree. Either strict or generalized, the saturation tree correlation must be detected, evaluated and controlled for the desired compensation of the saturation tree.

Figure 6:
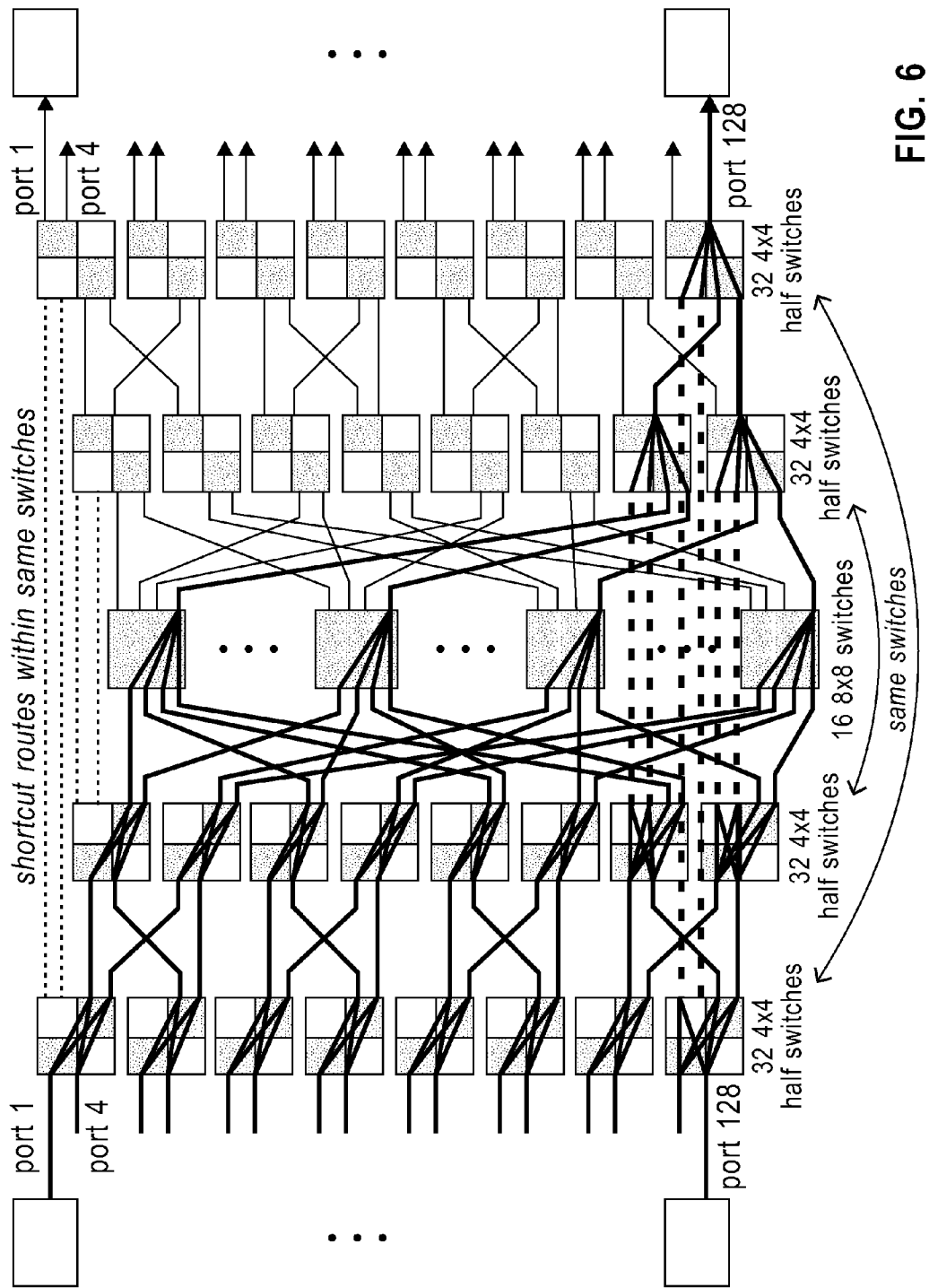
FIG. 6 shows a schematic block diagram illustrating the generation of a strict saturation tree phenomenon.

FIG. 6 illustrates the hotspot contention problem using a lossless three stage 32 ports, 3 level fat tree communication network using 8×8 switches, drawn in an unfolded unidirectional representation illustrating its 5 actual stages of switching. Corresponding "half" switches on the left and right hand side are collocated in the same physical switches.

In a sufficient fraction of all the inputs/traffic targets, one of the output parts (in FIG. 6 the output parts labeled by 128), the output link, can become saturated. Should this happen persistently, it causes the queues in the switch feeding that link to fill up. If the traffic pattern persists indefinitely, then (no matter what techniques are used to re-assign buffer space) it is all ultimately exhausted. This forces that switch's link-level flow control (since the network is lossless) to throttle back all the inputs feeding that switch. That in turn ultimately causes the next stage of switching to fill its buffer space, and so on, back to the communication network's inputs. This so-called saturation tree phenomenon is also known as tree saturation (G. F. Pfister and V. A. Norton "Hot Spot Contention and Combining in Multistage Interconnection Networks", IEEE Transaction on Computers, Vol. C-34, No. 10, October 1985, pp. 943-948) or in other contexts, congestion spreading.

Once the saturation tree of saturated switches is fully formed, every data packet must cross at least one saturated switch. Since the time to exit a queue grows exponentially the further a switch is from the hotspot, a majority of the delay is incurred even if only a single switch must be crossed. Hence, the network as a whole suffers a loss of throughput; its aggregate throughput is gated by the throughput of the single hotspot output.

Furthermore, the amount of traffic that must target the hotspot output decreases proportional to network size. For example, in an 128-input and 128-output network like that illustrated in FIG. 6, slightly more than 1/128 of each input's injected traffic must target the hotspot output to saturate that output. However, in a 1024-input and 1024-output, less than 0.1% of each input's injected traffic must target the hotspot output for the same problem.

Finally, saturation spreads very quickly. The saturation tree is filled in less than 10 traversal times of the network which is far too quickly for control software to react in time to this problem. Naturally, the problem also dissipates slowly since all the queues involved must be emptied.

Saturation Tree Detection (and Saturation Tree Feature Monitoring)

Hereinafter, a method for the detection of a saturation tree (and thus the monitoring of features thereof) will be described with regard to the strict saturation tree and the generalized saturation tree as described above under a) and b). The detection & monitoring mechanism employs a reverse path of an inner loop such as described in reference to FIG. 5.

a) Strict saturation tree:

The simplest detection method requires counting the number (e.g. congested hotspot count) of sequential hotspots. This can be distributed or centralized. When distributed, it can be performed as follows:

The method can be performed inside a datacenter if for example every switch upstream of a prior hotspot snoops on, for example congestion notification messages flowing upstream toward the congestion source. Congestion notification messages (or CNMs) form the basis of a first traffic regulation mechanism in this case. More precisely, they determine the transmission rate adjustments of the first traffic regulation mechanism. Relevant congestion notification messages are intercepted and potentially modified accordingly, e.g. by increasing either the congested hotspot count (if existent) or the feedback value (hotspot severity).

Alternatively, the method can be performed at the datacenter interface, if for example the traffic sources can correlate the congestion notification messages from multiple hotspots. Each congestion network management includes feedback values and localization information, for example in quantized congestion notification (or QCN) the congestion point ID or the IP address, etc. When a centralized monitoring console (such as a hardware or software entity) receives the original or a copy of the feedback signal it builds a correlation pattern corresponding to the saturation tree based upon the original or copy.

b) Generalized saturation tree:

The detection and monitoring of generalized saturation trees can require keeping track of past hotspots, their location, timing (i.e. start, duration) and characteristics, including (but not limited) to the type, input or output generation, severity, and degree (i.e. number of flows).

c) Saturation tree feature access (measurement):

The detection and evaluation of a saturation tree, i.e., the saturation tree assessment, can be advantageously performed during a same step. Factors increasing the severity of a saturation tree are, for example, network size, number of nodes, link speed, radix of switches, queuing and buffering size, distance between the saturation tree and the data source, etc.

Advantageously, the saturation tree's feature access includes the steps of:

i. Counting the number of adjacent, or at least neighboring, hotspots, whose location can be identified, e.g. by the means of a congestion point identification scheme, such as the CPID as defined by 802 QCN, or equivalent;

ii. Establishing the hotspots' correlation, e.g. by exceeding a hotspot count threshold of at least two, e.g. hs_count_threshold>2.

iii. Performing the aforementioned steps during a bounded time interval, hotspot counting time, dependant on the type, speed, size and other factors, and setting the lower and upper boundaries, respectively. For example: 2xRTT_link<hs_count_time<0.5 ms.

All this forms an example of a set of saturation tree features, which can advantageously be relied upon for subsequently adapting the data traffic. The result of the saturation tree detection and evaluation e.g. constitutes the feedback conveyed to the saturation tree compensator by the inner loop shown in FIG. 5.

Other features/evaluation of the saturation could still be relied upon. The resulting features should provide a convenient measure of the saturation tree, in one way or the other. In addition, note that independently of how the saturation tree is evaluated, the features of the saturation need at least to be monitored, that is, to be accessed at least once, in order to implement a corrective scheme, as discussed earlier. Thus, evaluation of the saturation tree can, in an embodiment, be outsourced to another entity that the entity that implements the corrective scheme.

The saturation control and compensation mechanism is described by the forward path of the inner loop in FIG. 5.

In particular, embodiments of the present invention aim at augmenting the traditional congestion management methods such as TCP and QCN in order to curb the saturation tree congestion. Accordingly, the method may include concurrent steps of data traffic regulations. A first regulation is for example the TCP or QCN regulation mechanism, whereas a second regulation mechanism as described above is concurrently implemented. Hence, a purpose of the saturation tree compensator or saturation tree regulation inside the inner loop is to adaptively modify the original rate/window controller according to monitored features of the detected saturation tree.

In particular, beyond the sole first mechanism, the data rate can be additionally reduced by another factor, e.g. a multiplicative factor, which the saturation tree compensator adaptively modifies inside the inner loop. Depending on the monitored features of the saturation, the saturation tree compensator may, for example, apply a further reduction factor such as a multiplicative factor, less than 1, for example between 0.8 and 0.95, which turns out to be mostly convenient in practice. The multiplicative factor can in fact be adaptively chosen within a given range (within 0-1), based on the monitored features of the saturation tree. It can also be fixed to a single value, e.g. 0.9. In other words, a given data rate or a given percentage of the data rate can be used, leading to a reduction of the data rate of e.g. 5% to 20%. This kind of data rate reduction provides a smart and secure possibility to avoid congestions in the first communication path: the reduced data rate remains below a threshold at which congestion starts.

According to a detailed example, upon the reception of a control signal of the congestion network management, the original QCN/TCP controller will conduct the following steps:

1. Reduction:
    The data rate (i.e. the data volume injected into the communication network per unit of time) is initially reduced by the inner loop in FIG. 5 with a gain factor (e.g. linear, multiplicative or exponential), in excess of the original gain of the outer loop representing the QCN (or possibly TCP) control loop. The inner loop effectively re-tunes the outer loop's gains—normally designed for non-saturation tree congestion control—in order to curb the saturation tree whose features have been accessed as in steps (b,c i-iii) above.
2. Wait:
    The data rate is additionally being reduced, proportional with each newly received saturation tree feature information, while counting time and/or injected data packets, similar to the QCN outer loop.
3. Recovery:
    After a certain amount of time from the reception of the last saturation tree feature information, the data rate will be increased toward the original data rate, similar to QCN, but adding a conservative delay margin. This corresponds to the end of the saturation tree congestion.

Based on the features of the detected saturation tree, the saturation tree compensator or regulation may therefore employ one or more of the following measures:
    I. Increasing the reduction gain according to 1;
    II. Extend the duration of the wait period of 2;
    III. Decrease the recovery gain according to 3;
    IV. Employ any other combination of increasing and decreasing the data rate of the above steps 1-3, proportional to the factors that depend on the saturation tree evaluation.

While embodiments and applications of this invention have been shown and described above, it should be apparent to those skilled in the art, that many more modifications (than mentioned above) are possible without departing from the inventive concept described herein. The invention, therefore, is not restricted except in the spirit of the appending claims.

It is therefore intended that the foregoing detailed description is to be regarded as illustrative rather than limiting and that it is understood that it is the following claims including all equivalents described in these claims that are intended to define the spirit and the scope of this invention. Nor is anything in the foregoing description intended to disavow the scope of the invention as claimed or any equivalents thereof.

Furthermore, embodiments of the present invention are not limited to the internet or an Ethernet communication network, but can be used in various other communication networks, such as WLAN, WAN, VPN, LAN, etc. Furthermore, embodiments of the present invention are not limited to a wired communication network but can advantageously also be used in any communication network, especially in a wireless communication network or a communication network that employs wireless and wired communication.

Embodiments of the present invention outlined above may also be embedded in a computer program product, which includes all the features enabling the implementation of the methods described herein, and which when loaded in a computer system is able to carry out the single steps of these methods. Computer program in the present context means any expression in any language, code or notation of a set of instructions intended to cause a system having an information processing capability to perform a particular function either directly or after a conversion to another language, code or notation or after reproduction in a different material form.

Embodiments of the present invention can be realized in hardware, software, or a combination of hardware and software. Embodiments of the present invention can be realized in a centralized fashion in at least one computer system or in a distributed fashion where different elements are spread across several interconnected computer systems, nodes, datacenters and the like. Any kind of computer system or other apparatus adapted for carrying out the methods described herein is suited. A typical combination of hardware and software can be a general purpose computer system having a computer program that, when being loaded and executed, controls the computer system such that it carries out the methods described herein.

The method for managing the traffic in the communication network, as described in embodiments of the present invention, or any of its components can be embodied in the form of one or more computing devices. The computing device can be, for example, a general purpose computer, a programmable unit, a microprocessor, a microcontroller, a peripheral integrated circuit element, programmable logic devices such as FPGAs or PLDs and other devices or arrangements of devices which are capable of implementing these steps that constitute the method according to embodiments of the present invention.

In this document, relational terms such as first and second, top and bottom, and the like can be used solely to distinguish one entity or action from another entity or action without necessarily requiring or implying any actual relationship or order between such entities or actions. Furthermore, the terms "comprise/comprising", "have/having", "include/including", "contain/containing" or any variation thereof, are intended to cover a non-exclusive inclusion, such that the process, method, article, apparatus and does not include only those elements/steps but may include other elements/steps not listed or inherent to such process, method, article, or apparatus. Furthermore, the terms "a/an" are defined as one or more unless explicitly stated otherwise.

Furthermore, the one or a set of instructions or method steps can also include various instructions and steps. These sets of instructions and steps can be in part of a program or a program routine.

What is claimed is:
1. A method for data traffic management in a communication network, the method comprising:
    setting up a first communication path for a first data communication and transmitting data from a source of said first data communication to a destination of said first data communication;

monitoring features of a saturation tree representing a congestion of data transmission in said first data communication using a saturation tree sensor, wherein said saturation tree represents a congestion of data transmission due to at least one of said first data communication along said first communication path and a second data communication along at least a second communication path;

executing concurrent steps of data traffic regulations to control data traffic between said source and said destination, wherein a second one of these concurrent steps of data traffic regulation comprises monitoring said features of said saturation tree, wherein a first one of said concurrent steps of data traffic regulation comprises reducing a data rate according to a first factor sufficient for eliminating congestion of data transmission at a node in said first communication path, wherein said second one of said concurrent steps of data traffic regulation comprises reducing said data rate according to a second factor based on said monitored features; and adapting a data rate of said first data communication along said first communication path based on said monitored features using a control device operatively coupled to said saturation tree sensor.

2. The method according to claim 1,
wherein said second data communication uses at least one of parts and elements of said first communication path.

3. The method according to claim 1, wherein said saturation tree comprises at least one of multiple spatial and temporal inter-correlated hotspots caused by said first and said second data communications.

4. The method according to claim 1, wherein adapting the data rate further comprises reducing said data rate of said first data communication wherein congestion of data transmission in said first communication path is eliminated.

5. The method according to claim 1,
wherein said source is a datacenter, and
wherein said second one of said concurrent steps of data traffic regulation is implemented within said datacenter.

6. The method according to claim 5, wherein said second one of said concurrent steps of data traffic regulation at least partially supersedes a first one of said concurrent steps of data traffic regulation implemented at said first one of said concurrent steps.

7. The method according to claim 6,
wherein said monitored features of said saturation tree further comprise a model of said saturation tree, and
wherein said model is used as a control parameter of a feedback loop in said second one of said concurrent steps of data traffic regulation.

8. The method according to claim 7, further comprising building said model of said saturation tree by measuring and possibly approximating at least one of forward delays and backward delays in a congested part of said first communication path.

9. The method according to claim 8, wherein said step of adapting said data rate of said first data communication comprises implementing a method selected from the group consisting of a Ziegler-Nichols method, a Smith Predictor method, and a direct numerical calculation method.

10. A datacenter for data traffic management in a communication network, comprising:
a saturation tree sensor designed to monitor features of a saturation tree representing a congestion of data transmission in said communication network, wherein said data congestion is due to at least one of a first data communication along a first communication path and a second data communication along at least a second communication path; and a control device operatively coupled to said saturation tree sensor designed to adapt the data rate of a first data communication along a first communication path based on said monitored features, wherein the control device of said datacenter executes two or more of concurrent steps of data traffic regulations to control data traffic between a source and a destination, wherein a first one of said concurrent steps of data traffic regulation comprises reducing said data rate according to a first factor sufficient for eliminating congestion of data transmission at a node in said first communication path, wherein a second one of said concurrent steps of data traffic regulation comprises reducing said data rate according to a second factor based on said monitored features.

11. The datacenter according to claim 10,
wherein said second data communication uses at least one of parts and elements of said first communication path.

12. The datacenter according to claim 11, wherein at least one of said saturation tree sensor and said control device calculates a control parameter for use in a feedback loop in said control device.

13. The datacenter according to claim 12 wherein said control device provides a control signal for adapting said first data communication.

14. The datacenter according to claim 12, wherein the control device of said datacenter executes one of concurrent steps of data traffic regulations to control data traffic between a source and a destination.

15. A communication network, comprising:
a plurality of source nodes;
a plurality of destination nodes; and
a plurality of switching nodes arranged between said source nodes and said destination nodes to provide a plurality of data communication links between said source nodes and said destination nodes,
wherein at least one of said source nodes is a datacenter,
wherein said datacenter further comprises:
a saturation tree sensor designed to monitor features of a saturation tree representing a congestion of data transmission in said communication network, wherein said data congestion is due to at least one of a first data communication along a first communication path and a second data communication along at least a second communication path; and a control device operatively coupled to said saturation tree sensor designed to adapt the data rate of a first data communication along a first communication path based on said monitored features, wherein said datacenter executes two or more of concurrent steps of data traffic regulations to control data traffic between a source and a destination,
wherein a first one of said concurrent steps of data traffic regulation comprises reducing said data rate according to a first factor sufficient for eliminating congestion of data transmission at a node in said first communication path, wherein a second one of said concurrent steps of data traffic regulation comprises reducing said data rate according to a second factor based on said monitored features.

16. The communication network according to claim 15, wherein said second data communication uses at least one of parts and elements of said first communication path.

17. The communication network according to claim 15, wherein said communication network is a lossless communication network.

\* \* \* \* \*